United States Patent
Baik (10) Patent No.: US 7,203,146 B2
(45) Date of Patent: Apr. 10, 2007

(54) METHOD AND DEVICE FOR MANAGING PASSWORD IN OPTICAL DISC APPARATUS

(75) Inventor: Kwang Jun Baik, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 558 days.

(21) Appl. No.: 10/684,445

(22) Filed: Oct. 15, 2003

(65) Prior Publication Data

US 2004/0081047 A1    Apr. 29, 2004

(30) Foreign Application Priority Data

Oct. 15, 2002    (KR) ............. 10-2002-0062938

(51) Int. Cl.
*G11B 7/00*    (2006.01)

(52) U.S. Cl. ............................................. 369/53.21

(58) Field of Classification Search ................ None
See application file for complete search history.

(56) References Cited

U.S. PATENT DOCUMENTS

| | | | | |
|---|---|---|---|---|
| 6,006,333 | A * | 12/1999 | Nielsen | 726/8 |
| 6,243,816 | B1 * | 6/2001 | Fang et al. | 726/5 |
| 6,643,085 | B2 * | 11/2003 | Shirai et al. | 360/60 |
| 2001/0037459 | A1 * | 11/2001 | Ogawa et al. | 713/200 |
| 2002/0051627 | A1 * | 5/2002 | Tanaka et al. | 386/96 |

* cited by examiner

*Primary Examiner*—William Korzuch
*Assistant Examiner*—Christopher Lamb
(74) *Attorney, Agent, or Firm*—Birch, Stewart, Kolasch, and Birch, LLP

(57) ABSTRACT

Password management methods of an optical disc apparatus are provided for recording/reproducing data on an optical disc such as a CD or DVD disc. The password management method for managing a password in an optical disc apparatus, includes the steps of: a) determining if a current optical disc has been reproduced previously by the optical disc apparatus; and b) requesting a user to enter a first password prescribed by a user if the determining step (a) determines that the current optical disc has been reproduced previously.

16 Claims, 8 Drawing Sheets

Password Management Table (case1)

| Disc #1_ID | Disc #1_Password | User_Password #1 |
|---|---|---|
| Disc #2_ID | Disc #2_Password | User_Password #2 |
| Disc #3_ID | Disc #3_Password | User_Password #3 |
| ⋮ | ⋮ | ⋮ |
| Disc #n_ID | Disc #n_Password | User_Password #n |

Fig.3b

Password Management Table (case2)

| Disc #1_ID | Disc #1_Password | |
|---|---|---|
| Disc #2_ID | Disc #2_Password | |
| Disc #3_ID | Disc #3_Password | User_Password #1 |
| ⋮ | ⋮ | |
| Disc #n_ID | Disc #n_Password | |

Password Management Table (case3)

| Disc #1_ID | Disc #1_Password |
|---|---|
| Disc #2_ID | Disc #2_Password |
| Disc #3_ID | Disc #3_Password |
| ⋮ | ⋮ |
| Disc #n_ID | Disc #n_Password |

METHOD AND DEVICE FOR MANAGING PASSWORD IN OPTICAL DISC APPARATUS

The present application claims, under 35 U.S.C. § 119, the priority benefit of Korean Patent Application No. 2002-62938 filed Oct. 15, 2002, the entire contents of which are herein fully incorporated by reference.

BACKGROUND OF THE INVENTION

1. Field of the Invention

The present invention relates to an optical disc apparatus for recording data on an optical disc such as a CD or DVD disc, and reproducing the data recorded on the optical disc.

2. Description of the Related Art

Figure 1:
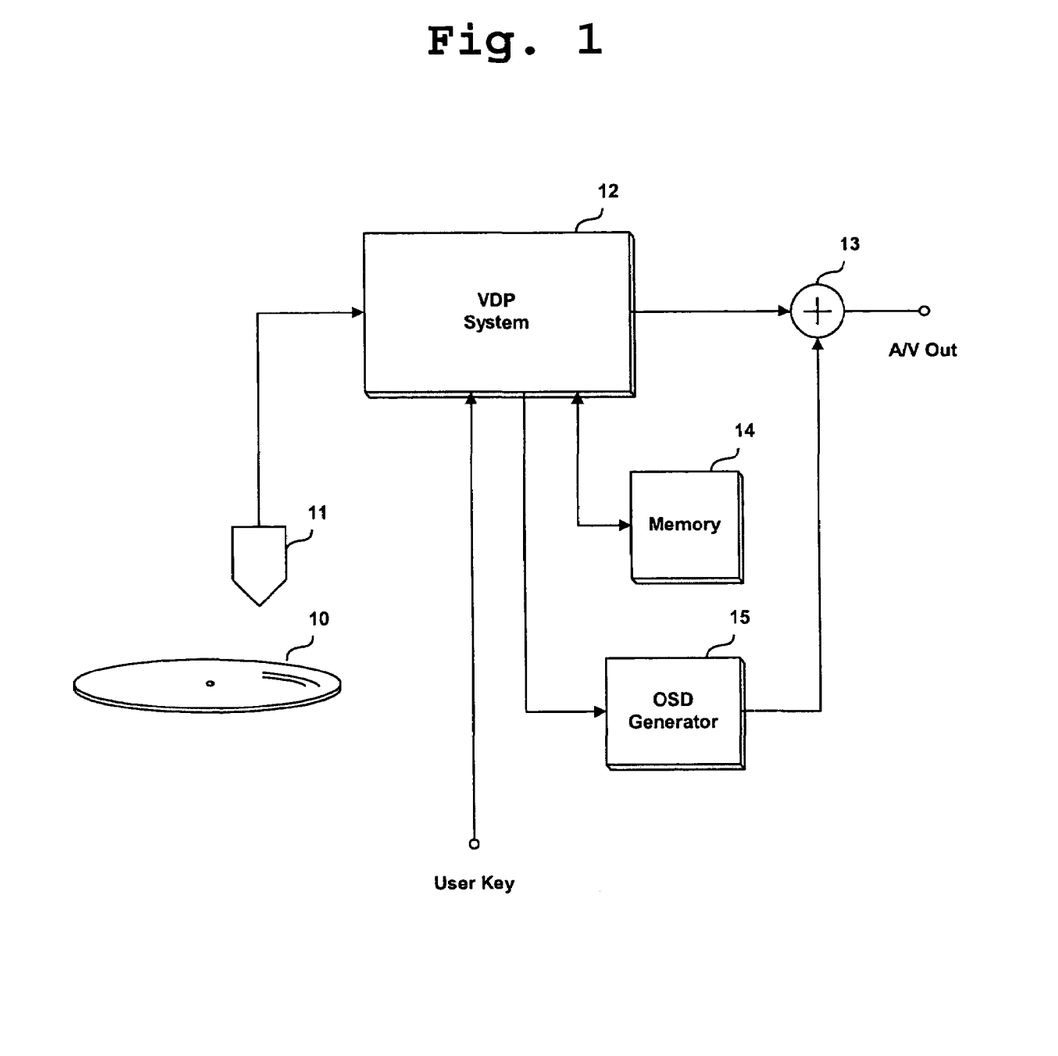
FIG. 1 is a view illustrating a block diagram of a conventional optical disc apparatus.

In recent times, there has been newly developed an optical disc apparatus capable of recording/reproducing high-quality video data and high-quality audio data storable thereon for a long time, for example, a DVD (Digital Versatile Disc) player, such that the optical disc apparatus has become increasingly popular as a recording medium. FIG. 1 depicts a block diagram of a conventional optical disc apparatus. As shown in FIG. 1, the conventional optical disc apparatus includes an optical pick-up unit 11 for recording data on an optical disc 10 or reproducing the data recorded on the optical disc 10, a VDP (Video Disc Player) system 12, a signal combiner 13, a memory 14, and an OSD (On-Screen Display) generator 15.

Figure 2:
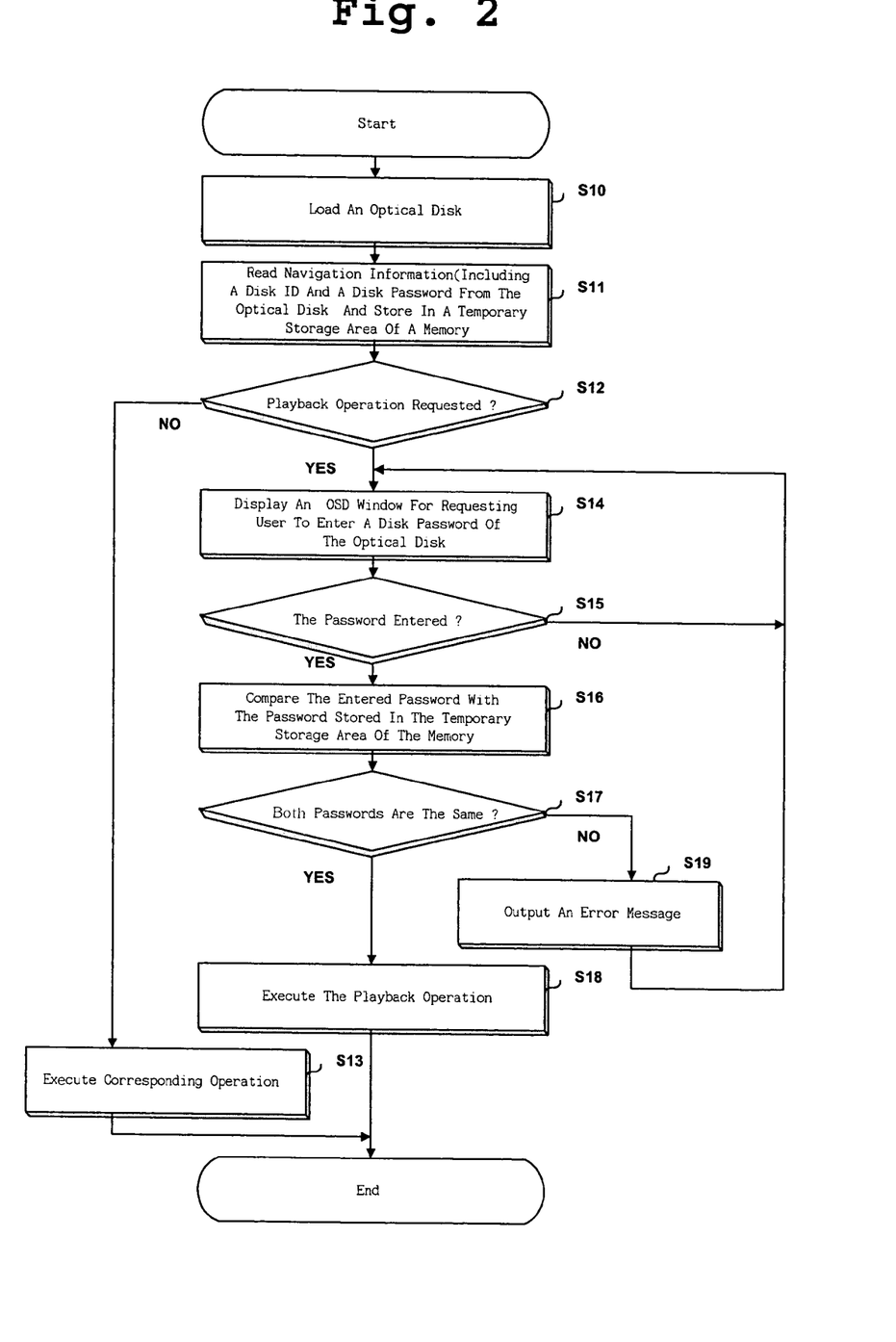
FIG. 2 is a flow chart illustrating a password management method for the conventional optical disc apparatus shown in FIG. 1.

FIG. 2 is a flow chart illustrating a password management process for the conventional optical disc apparatus shown in FIG. 1. With reference to FIG. 2, if an optical disc 10 is loaded into the optical disc apparatus of FIG. 1 at step S10, the optical pick-up unit 11 reads navigation information additionally recorded on a lead-in area of the optical disc 10, and supplies the navigation information to the VDP system 12. Then, the VDP system 12 stores the supplied navigation information in a temporary storage area of the memory 14 at step S11. In this case, the memory 14 stores a unique password of the optical disc 10. The unique password has been typically adapted to determine whether the optical disc 10 is reproduced or not, and has not been freely changed by a user. All the optical discs have different unique passwords.

If a user enters a prescribed key command to start a disc playback function at step S12, the VDP system 12 displays an OSD window for requesting the user to enter a unique password of the optical disc 10 on a peripheral display such as a TV at step S14. In this case, the unique password may be indicated on a jacket of the optical disc 10 or may be provided to the user over an Internet Web site.

If the user enters the unique password on the OSD window at step S15, the VDP system 12 compares the entered password with a predetermined password stored in the temporary storage area of the memory 14 at step S16. If the entered password is identical with the predetermined password stored in the memory 14 at step S17, the VDP system 12 executes successive playback operations for normally reproducing the optical disc 10 at step S18.

On the other hand, if the entered password is different from the predetermined password at step S17, the VDP system 12 outputs an error message on a display screen to allow the user to recognize an erroneous password entry at step S19.

Therefore, it is impossible for a third-party user to fraudulently play the optical disc 10 inserted into the optical disc apparatus.

However, according to the aforementioned conventional optical disc apparatus, the user must manually enter a unique password pre-assigned to the optical disc by a manufacturer, such that it is impossible for the user to freely change the unique password of the optical disc. In addition, the user must memorize many passwords differently assigned to individual optical discs, or must visually check a unique password of an optical disc to be played whenever the user wants to reproduce any data stored in the optical disc, resulting in greater inconvenience for the user.

SUMMARY OF THE INVENTION

Therefore, the present invention has been made in view of the above problems, and it is an object of the present invention to provide a password management method for an optical disc apparatus, which enables a user to more conveniently determine whether an optical disc is reproduced by providing the user with a user password that can be freely set up by the user In accordance with one aspect of the present invention, the above and other objects can be accomplished by the provision of a method for managing a password in an optical disc apparatus, including the steps of: a) determining if a current optical disc has been reproduced previously by the optical disc apparatus; and b) requesting a user to enter a first password prescribed by the user if the determining step (a) determines that the current optical disc has been reproduced previously.

In accordance with another aspect of the present invention, there is provided a method for managing a password in an optical disc apparatus, including the steps of: a) determining if a current optical disc has been reproduced previously by the optical disc apparatus; and b) storing disc identifier (ID) information and a disc password for the current optical disc in a non-volatile storage area of a memory if the determining step (a) determines that the current optical disc has not been reproduced previously.

In accordance with another aspect of the invention, there is provided a device for managing a password in an optical disc apparatus, comprising: a first unit for determining if a current optical disc has been reproduced previously by the optical disc apparatus; and a second unit for requesting a user to enter a first password prescribed by the user if the first unit determines that the current optical disc has been reproduced previously.

In accordance with another aspect of the invention, there is provided a device for managing a password in an optical disc apparatus, comprising: a unit for determining if a current optical disc has been reproduced previously by the optical disc apparatus; and a non-volatile storage area of a memory for storing therein disc identifier (ID) information and a disc password for the current optical disc if the unit determines that the current optical disc has not been reproduced previously.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

A password management method according to the present invention can be adapted to an optical disc apparatus such as a DVD player composed of an optical pick-up unit 11, a VDP system 12, a signal combiner 13, a memory 14, and an OSD generator 15, etc., as shown in FIG. 1.

According to the present password management method, the VDP system 12 reads a disc ID (IDentification) for identifying an optical disc and a unique password Disc_Password pre-assigned to the optical disc so as to decide a playback mode of the optical disc from navigation information recorded on a lead-in area (or other designated area) of the optical disc, and stores the read disk ID and unique password in a temporary storage area of the memory 14.

Figure 3A:
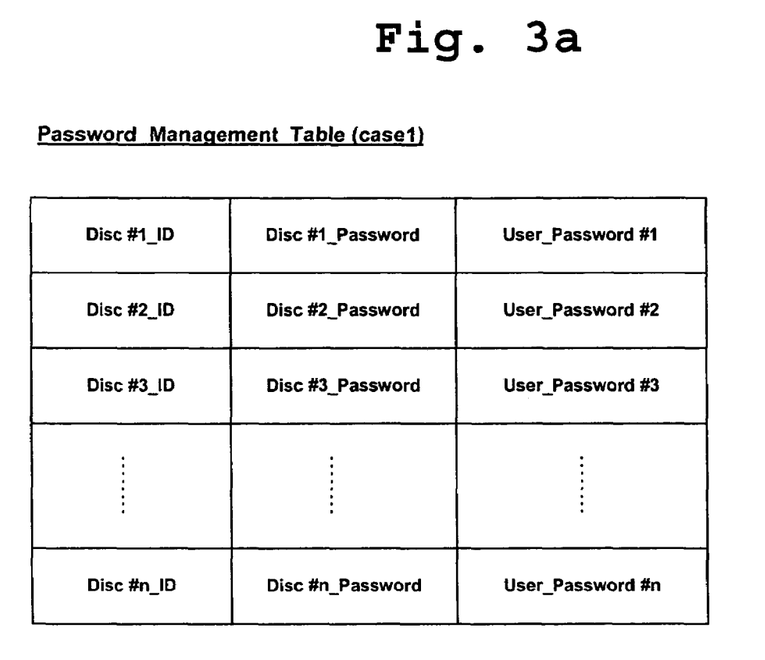
FIGS. 3a~3b are password management tables illustrating password management information stored in an optical disc apparatus in accordance with a preferred embodiment of the present invention.
Figure 3B:
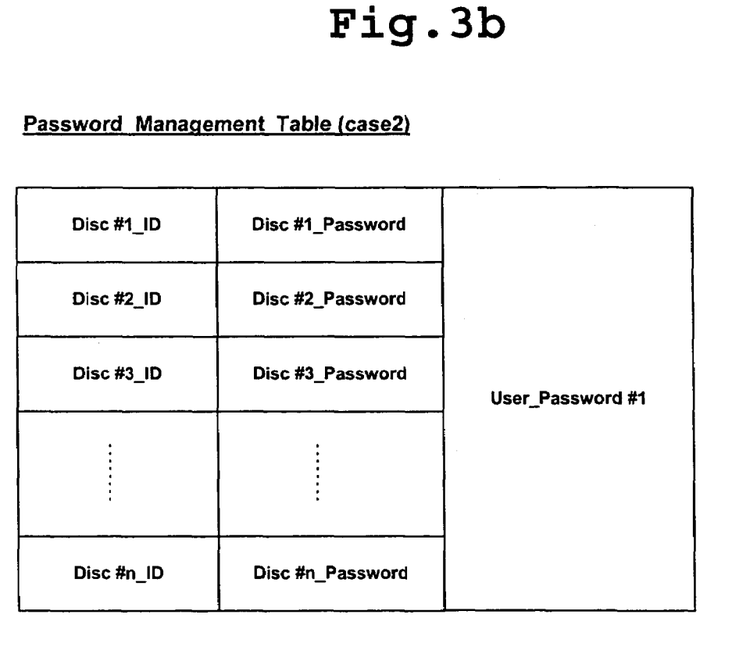

As shown in FIG. 3a, a plurality of user passwords User_Password#1~User_Password#n freely selected by a user are respectively associated with the pre-assigned unique passwords (e.g., by manufacturers) of the optical discs, and then stored with the disc IDs and the Disc_Passwords in a non-volatile area of the memory 14. In another variation, as shown in FIG. 3b, only one single user password User_Password#1 is associated with the different unique passwords of optical discs, and then stored with the disc IDs and the Disc_Passwords in the non-volatile area of the memory 14. In still another variation, each disc ID or disc password may be assigned to multiple user passwords, such that different users can access the same discs for playback or other designated operations requiring password verification. In this case, different multiple user passwords are assigned to and stored with each disc ID/password in the non-volatile area of the memory 14. All these variations of user passwords are recorded and managed as password management information formatted in a table, and will hereinafter be described in detail.

Figure 4A:
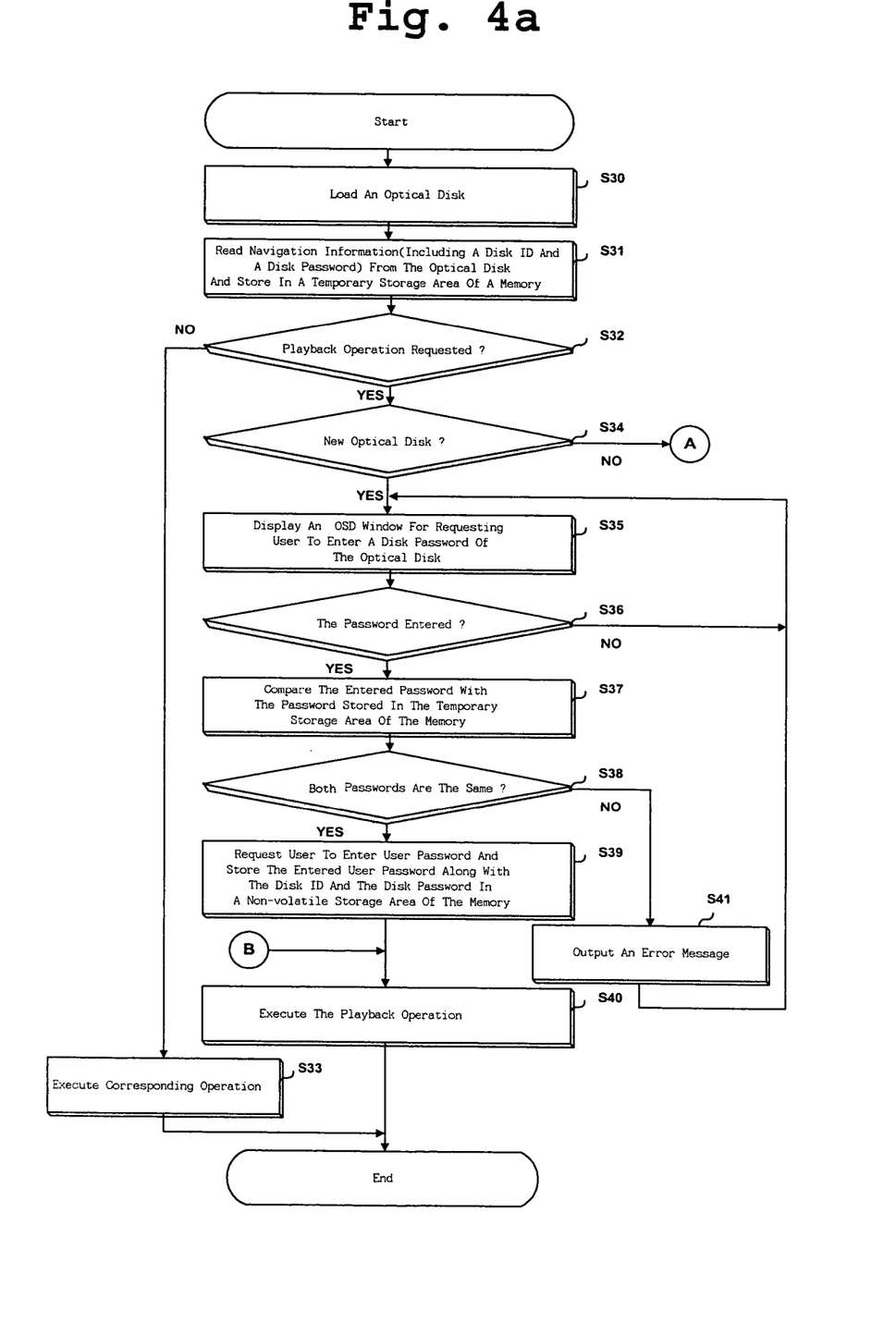
FIGS. 4a~4b are flow charts illustrating password management methods of the optical disc apparatus in accordance with the preferred embodiment of the present invention.
Figure 4B:
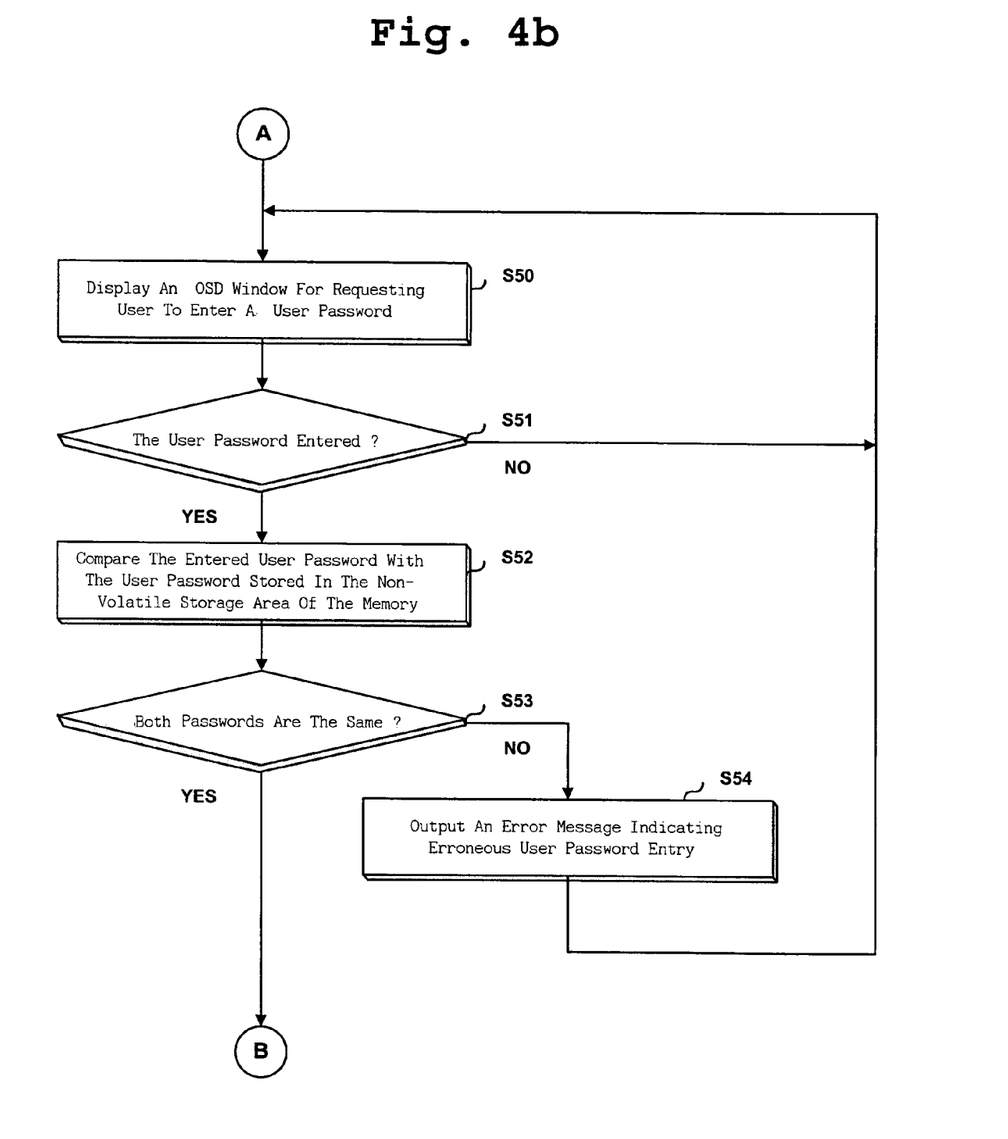

FIGS. 4a~4b are flow charts illustrating password management methods of the optical disc apparatus in accordance with a preferred embodiment of the present invention, and thereby this preferred embodiment will hereinafter be described with reference to the annexed drawings.

Referring to FIG. 4a, if an optical disc 10 is loaded into the optical disc apparatus as shown, e.g., FIG. 1, at step S30, the optical pickup unit 11 reads navigation information additionally recorded on a lead-in area (or other designated area) of the optical disc 10, and supplies the read navigation information to the VDP system 12. Then the VDP system 12 stores the supplied navigation information in a temporary storage area of the memory 14 at step S31. The navigation information includes a disc ID and a unique disc password for the present optical disc 10.

Here, the disc ID Disc_ID for identifying the optical disc is associated with the unique password Disc_Password adapted to decide a playback mode of the optical disc, which are stored in the temporary storage area of the memory 14.

Figure 5A:
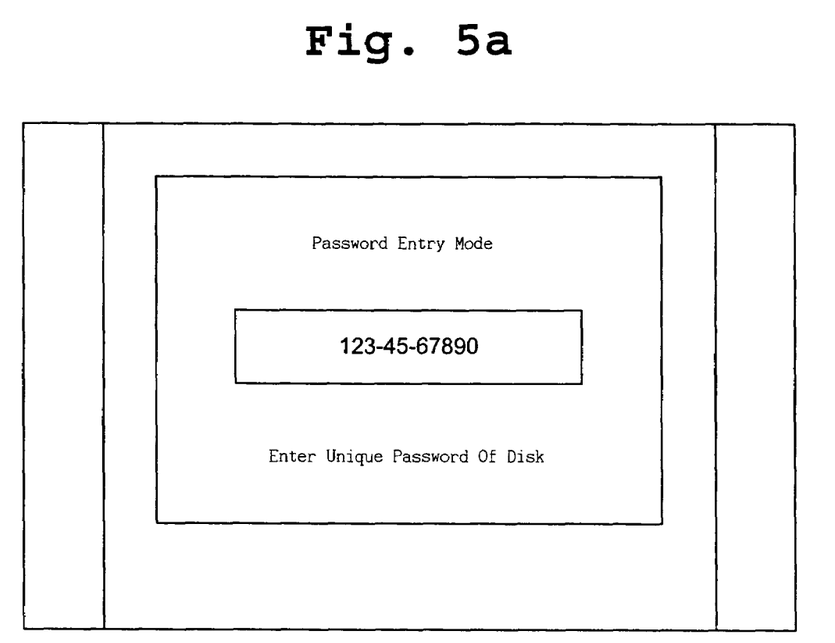
FIGS. 5a~5b are password entry windows displayed by the password management methods for use in the optical disc apparatus in accordance with the preferred embodiment of the present invention.

If a disc playback operation is not requested by a user at step S32, then other operations (e.g., requested by the user) may be executed at step S33. But, if a disc playback mode is requested by a user's command at step S32, the VDP system 12 determines whether the optical disc inserted into the optical disc apparatus is initially requested to be played by a user, i.e., whether the inserted disc is a new optical disc, at step S34. For example, in the case where the disc ID Disc_ID read from the optical disc is not stored in a non-volatile area of the memory 14, the VDP system 12 determines that the optical disc is a new optical disc being initially playback-requested by the user. Here, the temporary storage area of the memory 14 is different from the non-volatile (permanent) area of the memory 14. Then the VDP system 12 controls the OSD generator 15 to indicate an OSD window shown in FIG. 5a on a peripheral display such as a TV at step S35. The OSD window requests the user to enter a unique pre-assigned password of the optical disc 10. The unique password of the optical disc may be assigned by a manufacturer and/or indicated on the jacket and/or packaging of the disc, or may be provided to the user in some other way, e.g., over a network such as an internet website or e-mail.

Figure 5B:
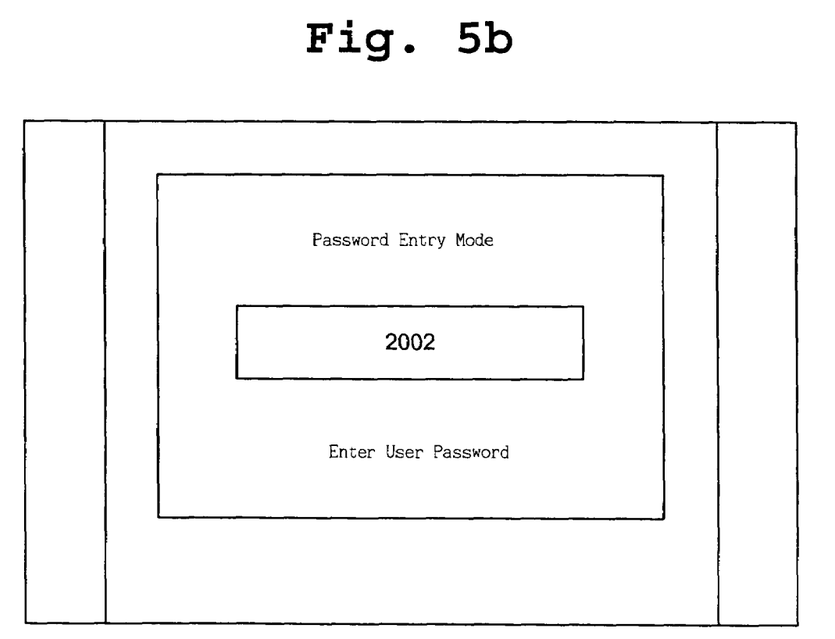

If the user enters the unique password of the optical disc 10 on the OSD window at step S36, the VDP system 12 compares the entered password with a predetermined password Disc_Password stored in the temporary storage area of the memory 14 at step S37. If the entered disc password is identical with the predetermined disc password stored in the temporary storage area of the memory 14 at step S38, the VDP system 12 determines that the disc ID and the disc password of the current optical disc 10 need to be added to a user management list requested by the user, and displays the OSD window for requesting the user to enter a user password User_Password adapted to approve data addition to the user management list on the peripheral display such as a TV, as shown in FIG. 5b.

The VDP system 12 then stores the user password entered on the OSD window along with the disc ID Disc_ID and the unique disc password Disc_Password of the current optical disc in the non-volatile area (or other designated area) of the memory 14 (more permanently) as password management information as shown in, e.g., FIGS. 3a or 3b at step S39, and then executes successive playback operations for reproducing the optical disc at step S40.

However, if the entered disc password is different from the predetermined disc password stored in the temporary storage area of the memory 14 at step S38, the VDP system 12 generates an error message to enable the user to recognize an erroneous disc password entry at step S41 and the process returns to step S35.

In the meantime, if it is determined that the disc ID Disc_ID read from the optical disc 10 is previously stored in the user management list of the non-volatile area of the memory 14, the VDP system 12 determines at step S34 that the optical disc 10 is an old optical disc (e.g., it has been reproduced by the current or other user(s). In this case, the VDP system 12 controls the OSD generator 15 to output an OSD window as shown in FIG. 5b for requesting the current user to enter a user password User_Password to a peripheral display such as a TV at step S50 shown in FIG. 4b.

Referring to FIG. 4b, in the case where the user enters the user password User_Password on the OSD window at step S51, the VDP system 12 compares the entered user password with the user password(s) associated with the current disc ID or password stored in the user management list of the non-volatile area of the memory 14 at step S52. If the entered user password is identical with the user password(s) (for the current disc) of the user management list at step S53, the VDP system 12 returns to step S40 to execute successive playback operations for reproducing the optical disc.

On the other hand, if the entered user password is different from the user password of the user management list present in the non-volatile area of the memory 14 at step S53, the VDP system 12 outputs an error message to inform the user of an erroneous user password entry at step S54 and the process returns to step S50 or ends. In the alternative, after the error message is displayed at step S54, the OSD window for requesting a unique password of the optical disc is displayed on a screen, and a common user who does not know the correct user password enters the unique password of the optical disc on the OSD window, resulting in the execution of a normal playback operation.

For reference, a plurality of disc passwords stored and managed in the memory 14 may be respectively associated with the same user password at the same time. Moreover, the present invention can be applicable to not only the optical disc apparatus, but also a variety of electronic appliances having password functions.

Figure 6:
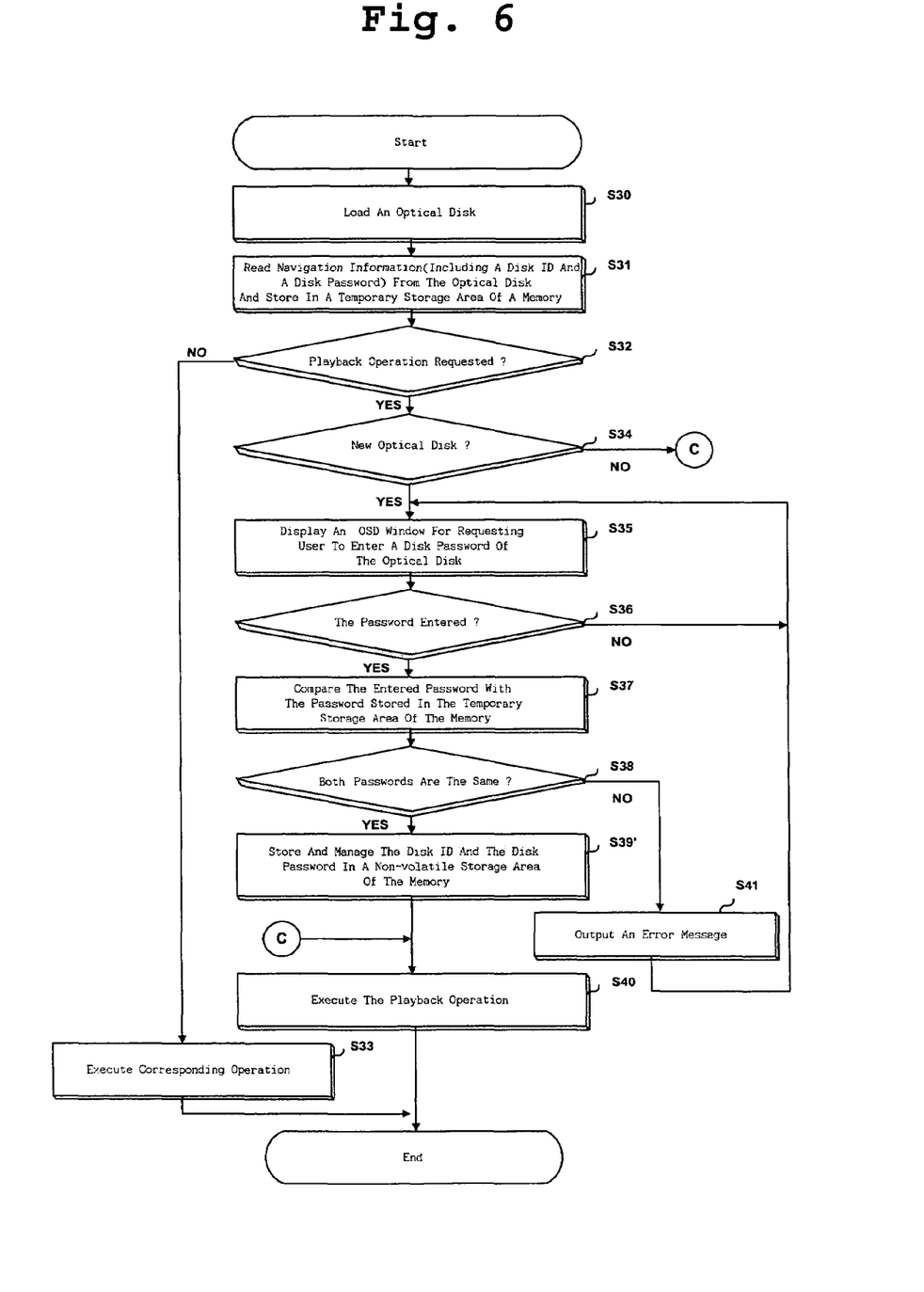
FIG. 6 is a flow chart illustrating a password management method for an optical disc apparatus in accordance with another preferred embodiment of the present invention.

FIG. 6 is a flow chart illustrating a password management method for an optical disc apparatus in accordance with a second preferred embodiment of the present invention. In the drawing, the same elements are denoted by the same reference numerals as in FIGS. 4a~4b, and their detailed description will be omitted below. There are two differences between the second preferred embodiment and the above first preferred embodiment of FIGS. 4a~4b, i.e., an operation flow established on the condition that a current optical disc is not a new optical disc being initially playback-requested, and a storage management flow associated with a user management list of a non-volatile area of the memory 14.

Figure 7:
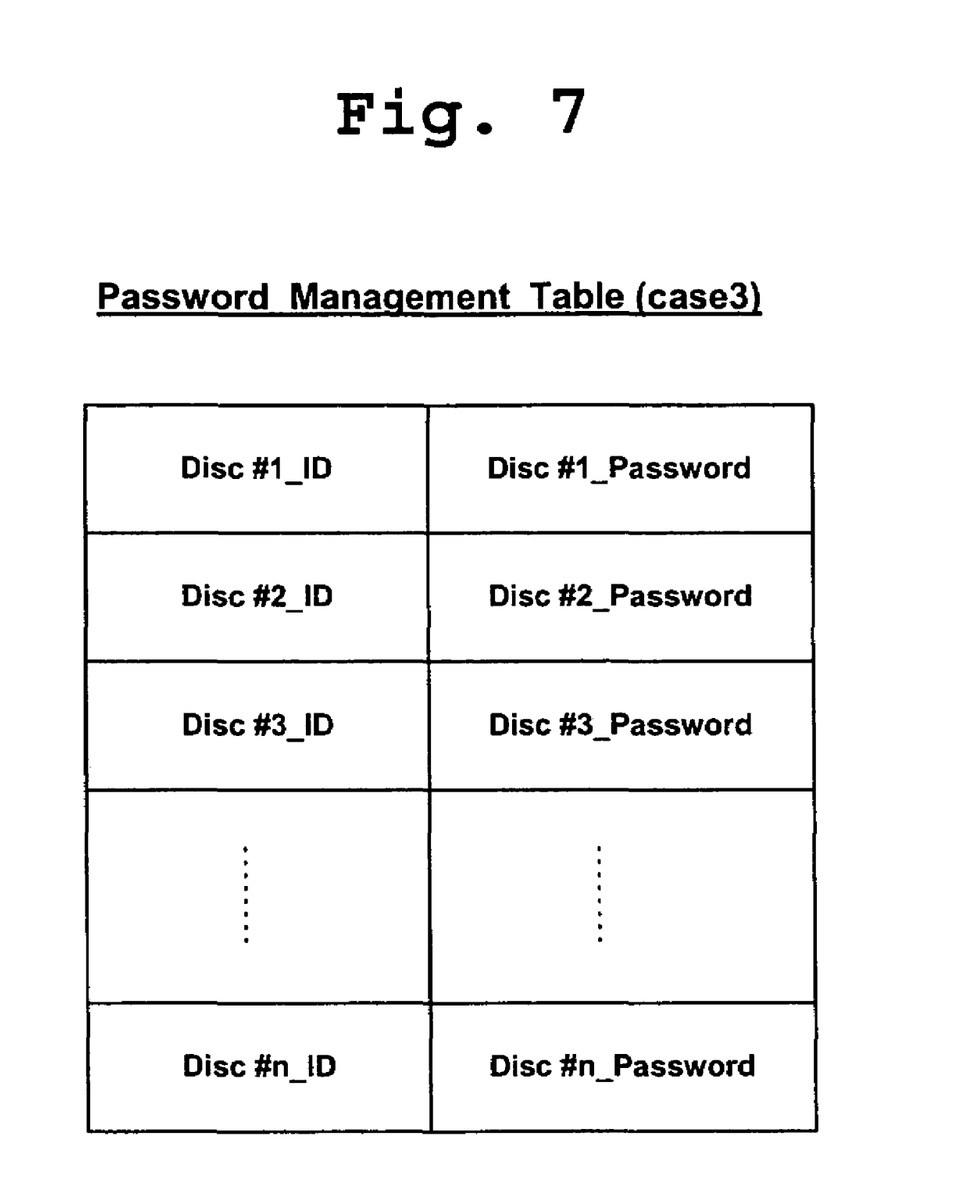
FIG. 7 is a password management table illustrating password management information stored in the optical disc apparatus in accordance with another preferred embodiment of the present invention.

In more detail, in the case where it is determined that a current optical disc inserted into the apparatus is a new optical disk (e.g., first time playback-requested optical disc), and that the unique password Disc_Password of the optical disc entered by the user is identical with a unique disc password associated with the current disc (disc ID) and pre-stored in a temporary storage area of the memory 14 at step S38, then the disc ID Disc_ID stored in the temporary storage area of the memory 14 and the unique password Disc_Password of the optical disc are also stored in a non-volatile area of the memory 14 as password management information as shown in FIG. 7 at step S39', and then successive playback operations for reproducing the optical disk inserted into the optical disk apparatus are performed at step S40.

On the other hand, in the case where it is determined that the current optical disc is not a new optical disk at step S34, e.g., in the case where the disc ID Disc_ID and the unique password Disc_Password of the current optical disc are previously stored in the non-volatile area of the memory 14 as password management information, then the VDP system 12 goes to step S40 to immediately execute a disc playback operation requested by the user.

Therefore, according to the second preferred embodiment shown in FIG. 6, there is no need for the user to enter an additional user password for an optical disc having been reproduced more than one time.

As apparent from the above description, the present invention provides a password management method of an optical disc apparatus for recording/reproducing data on an optical disc such as a CD or DVD disc, which determines whether a new optical disc initially inserted into the apparatus is reproduced on the basis of a unique disc password assigned to the optical disc, and determines whether an old optical disc having been reproduced more than one time is reproduced on the basis of a user password freely prescribed by a user, such that it is impossible for a third-party user to fraudulently play the optical disc, and the user need not memorize and visually check unique disc passwords differently assigned to many optical discs prior to entering his or her desired password to the optical disc apparatus, resulting in greater convenience for the user.

Alternatively, the present invention provides a password management method of an optical disc apparatus for recording/reproducing data on an optical disc such as a CD or DVD disc, which determines whether a new optical disc initially inserted into the apparatus is reproduced on the basis of a unique disc password assigned to the optical disc, and immediately reproduces an old optical disc having been reproduced more than one time without checking its password, such that it is impossible for a third-party user to fraudulently play the optical disc, and the user need not manually enter a password to the optical disc apparatus whenever the user wants to play the optical disc, resulting in greater convenience for the user.

It should be noted that the present method of managing and using passwords are also applicable to performing operations other than the playback operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for managing a password in an optical disc apparatus, comprising:
   a) determining if a current optical disc has been reproduced previously by the optical disc apparatus;
   b) requesting a user to enter a first password prescribed by the user if the determining step (a) determines that the current optical disc has been reproduced previously;
   c) requesting the user to enter a unique non-user prescribed second password assigned to the current optical disc if the determining step (a) determines that the current optical disc has not been reproduced previously;

d) comparing the entered second password with a password stored in a memory;

e) requesting the user to enter the first password prescribed by the user if the comparing step (d) result indicates that the entered second password matches the stored password; and f) storing, in the memory, the entered first password in an associated linking manner with the second password and disc ID information for the current optical disc.

2. The method as set forth in claim 1, further comprising:

(g) comparing the entered first password with a password prestored in the memory; and (h) performing a requested disc operation on the current optical disc if the comparing step (g) result indicates that the entered first password matches the prestored password.

3. The method as set forth in claim 2, wherein the determining step (a) includes:

determining if there exists the disc identifier (ID) information stored in the memory, that corresponds to the current optical disc; and determining that the current optical disc has been reproduced previously by the optical disc apparatus if the disc ID information exists.

4. The method as set forth in claim 2, wherein the memory is a non-volatile storage memory.

5. The method as set forth in claim 1, further comprising:

(g) performing a requested disc operation on the current optical disc after the storing step (f).

6. The method as set forth in claim 1, wherein one single first password is stored in the first area of the memory in linking association with multiple optical discs.

7. The method as set forth in claim 1, wherein a plurality of first passwords are associated in a linking manner respectively with a plurality of different optical discs and stored in the memory.

8. The method as set forth in claim 1, wherein the memory is a temporary storage area.

9. The method as set forth in claim 1, wherein the second password is a disc password unique to the current optical disc.

10. The method as set forth in claim 1, wherein the second password is indicated on a jacket of the current optical disc or is provided over an internet website.

11. A method for managing a password in an optical disc apparatus, comprising:

a) determining if a current optical disc has been reproduced previously by the optical disc apparatus;

b) storing disc identifier (ID) information and a disc password for the current optical disc in a memory in the optical disc apparatus if the determining step (a) determines that the current optical disc has not been reproduced previously; and c) requesting the user enter the disc password stored in the memory of the optical disc apparatus and requesting the user enter a user-created password that is associated in a linking manner with the disc password if the disc has not been previously reproduced such that the user can enter the user-created password to again playback the disc.

12. The method as set forth in claim 11, further comprising:

(d) performing a requested disc operation on the current optical disc if the determining step (a) determines that the current optical disc has been reproduced previously.

13. The method as set forth in claim 12, wherein the performing step (d) is carried out immediately after the determining step (a) if the determining step (a) determines that the current optical disc has been reproduced previously.

14. The method as set forth in claim 11, wherein the determining step (a) includes:

determining if there exists disc identifier (ID) information stored in the memory, that corresponds to the current optical disc; and determining that the current optical disc has been reproduced previously by the optical disc apparatus if the disc ID information exists.

15. The method as set forth in claim 11, wherein the unique disc password is indicated on a jacket of the current optical disc or is provided over an internet web site.

16. A device for managing a password in an optical disc apparatus, comprising:

a controller configured to determine if a current optical disc has been reproduced previously by the optical disc apparatus; and a memory configured to store therein disc identifier (ID) information and a disc password for the current optical disc if the controller determines that the current optical disc has not been reproduced previously, wherein the controller requests the user enter the disc password stored in the memory of the optical disc apparatus and requests the user enter a user-created password that is associated in a linking manner with the disc password if the disc password entered by the user matches the disc password stored in the memory such that the user can enter the user-created password to again playback the disc.

* * * * *